United States Patent [19]

Tozaki et al.

[11] Patent Number: 5,704,658
[45] Date of Patent: Jan. 6, 1998

[54] CONNECTOR HAVING IMPROVED REMOVABILITY

[75] Inventors: Kenji Tozaki; Minoru Kaneko, both of Aichi-ken, Japan

[73] Assignee: Kabushiki Kaisha Togo Seisakusho, Japan

[21] Appl. No.: 574,248

[22] Filed: Dec. 18, 1995

[30] Foreign Application Priority Data

Dec. 28, 1994 [JP] Japan ................. 6-327617
May 1, 1995 [JP] Japan ................. 7-107541

[51] Int. Cl.$^6$ ............................ F16L 37/088
[52] U.S. Cl. ............. 285/305; 285/321; 285/307
[58] Field of Search ....................... 285/314, 307, 285/321, 305

[56] References Cited

U.S. PATENT DOCUMENTS

| | | | |
|---|---|---|---|
| 1,029,819 | 6/1912 | Nylander | 285/314 |
| 2,449,920 | 9/1948 | Williams | 285/314 |
| 2,869,099 | 1/1959 | Robinson | 285/307 |
| 3,403,930 | 10/1968 | Bernier | 285/321 |
| 4,226,445 | 10/1980 | Kramer . | |
| 4,278,276 | 7/1981 | Ekman | 285/321 |
| 4,635,974 | 1/1987 | Moussain | 285/321 |
| 4,640,534 | 2/1987 | Hoskins et al. | 285/321 |
| 4,696,497 | 9/1987 | Schwarzensteiner | 285/307 |
| 4,712,708 | 12/1987 | Taguchi | 137/382 |
| 4,884,829 | 12/1989 | Funk et al. | 285/321 |
| 5,211,427 | 5/1993 | Washizu | 285/305 |

FOREIGN PATENT DOCUMENTS

| | | | |
|---|---|---|---|
| 2013202 | 10/1970 | Germany | 285/307 |
| 4142640 | 7/1992 | Germany . | |
| 9309773 | 8/1993 | Germany . | |
| 4296291 | 10/1992 | Japan | 285/314 |
| 37928 | 9/1906 | Switzerland | 285/319 |
| 1007203 | 10/1965 | United Kingdom | 285/314 |
| 2257217 | 1/1993 | United Kingdom . | |
| 93/00404 | 1/1993 | WIPO . | |

*Primary Examiner*—Eric K. Nicholson
*Attorney, Agent, or Firm*—Palmatier, Sjoquist, Helget & Voigt, P.A.

[57] ABSTRACT

A connector includes a body having a pipe receiving portion and includes a clip which cooperates with a removal prevention protrusion formed on the pipe for preventing the pipe from removal from the body. The pipe receiving portion has an inner diameter to permit insertion of at least the pipe. A clip fitting portion is formed on the pipe receiving portion and has engaging holes. The clip is made of resilient material and has a ring-shaped configuration. The clip has both circumferential ends confronting each other. The clip is biased in a direction to reduce its diameter and can expand its diameter for fitting on the clip fitting portion. Engaging claws are formed on the clip and adapted to be inserted into the engaging holes so as to engage the pipe. Each of the engaging claws includes a rear surface which abuts on the pipe when the pipe is inserted and which is formed as an inclined surface for permitting insertion of the pipe. Each of the engaging claws has one lateral surface in the circumferential direction of the clip. The lateral surface is formed as an inclined surface, so that each engaging claw is removed from the corresponding engaging holes when the clip is rotated.

5 Claims, 11 Drawing Sheets

CONNECTOR HAVING IMPROVED REMOVABILITY

BACKGROUND OF THE INVENTION

1. Field of the Invention

The present invention relates to a connector which is operable to connect a pipe such as a fuel pipe of an automobile with the pipe prevented from removal and which is operable to permit removal of the pipe by releasing the removal prevention state.

2. Description of the Prior Art

This kind of connector is disclosed in Japanese Utility Model Publication No. 35-29070 and will now be described with reference to FIGS. 23, 24 and 25.

Numeral 201 designates a connector for connecting a pipe 203. An annular groove 203a is formed on an outer circumferential surface of the pipe 203 in a position adjacent one end of the pipe 203 on the side of the connector 201, so that a stepped portion 203c is formed between the bottom of the annular groove 203a and one of side walls of the annular groove 203a on the side of the connector 201. The stepped portion 203c includes a first diameter part 203d positioned on one side (right side in FIG. 23) and includes a second diameter part 203b positioned on the other side (left side in FIG. 23). The first diameter part 203d has a diameter greater than a diameter of the second diameter part 203b.

The connector 201 is constituted of a body 204 and a clip 210. A through-hole 204a is formed in the body 204 and extends from one side (right side in FIG. 23) to the other side (left side in FIG. 23) thereof. The through-hole 204a includes a first hole part 204b positioned on one side and includes a second hole part 204c positioned on the other side. The first hole part 204b has a diameter smaller than the diameter of the first diameter part 203d of the pipe 203 having a greater diameter, while the second hole part 204c has a diameter slightly greater than the first diameter part 203d. A pair of engaging holes 204d are formed in the body 204 in an axial position within the range of the second hole part 204c having a greater diameter and extend from the outer surface of the body 204 to the through-hole 204a in diametrically opposed relationship with each other.

The clip 210 includes a spring 210a and a pair of engaging claws 212. The spring 210a has a substantially ring-like configuration and made of resilient material. The engaging claws 212 are inserted into their respective engaging holes 204d and extend into the through-hole 204a. Grips 213 and 214 are provided on the spring 210a and are operable by an operator to expand the spring 210a. When the spring 210a is expanded, the engaging claws 212 are removed from their respective engaging holes 204d.

In order to connect the pipe 203 to the connector 201, the pipe 203 is inserted into the through-hole 204a with the spring 210a held expanded, and the spring 210a is released to close when the annular groove 203a is brought to confront the engaging holes 204d or the engaging claws 212. Then, both engaging claws 212 are brought to enter the annular groove 203a and to abut on the stepped portion 203c, so that the pipe 203 is connected to the connecter 201 while the pipe 203 is prevented from removal. The pipe 203 can be removed by expanding the spring 210a. U.S. Pat. No. 5,154,450 discloses a connecter having the same construction as the connector as described in the Japanese publication.

With the conventional connector 201, in order to remove the pipe from the connector, the spring 210a of the clip 210 must be held expanded. Therefore, the conventional connector 201 is disadvantageous in the operability.

SUMMARY OF THE INVENTION

It is, accordingly, an object of the present invention to provide a connector which is improved in the operability when a pipe is removed from the connector.

The present invention includes the improvements in which at least one of lateral surfaces of each engaging claw in the circumferential direction is formed as an inclined surface. Such an inclined surface may be formed on one lateral surface of each engaging hole in the circumferential direction or may be formed on both the lateral surface of each engaging claw and the lateral surface of each engaging hole confronting thereto.

With this construction, the pipe can be removed from the connector by only rotating the clip relative to the body. When the clip is rotated relative to the body, each engaging claw is removed from its corresponding engaging hole under the guide of the inclined surface(s), so that the state where the pipe is prevented from removal from the connector can be released.

The invention will become more apparent from the appended claims and the description as it proceeds in connection with the drawings.

3

Figures 17A, 17B:
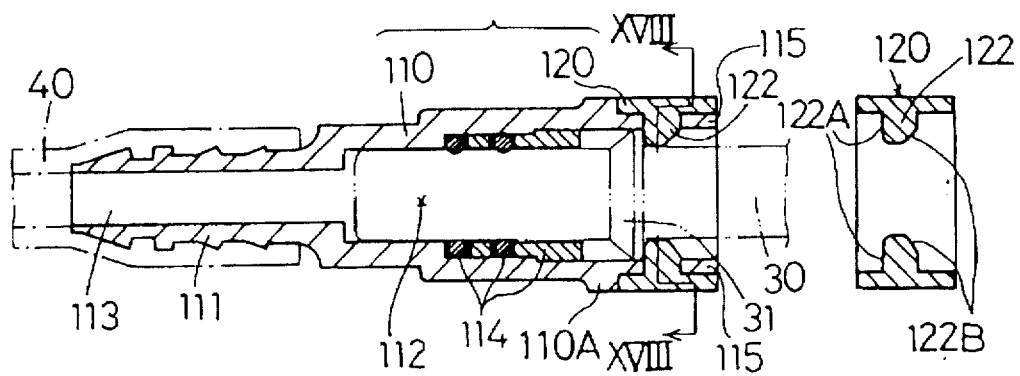
FIG. 17(A) is a sectional view of the connector of the third embodiment.
Figure 18A:
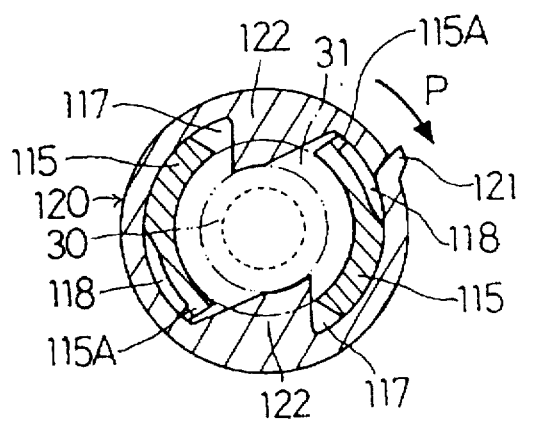
Figure 18B:
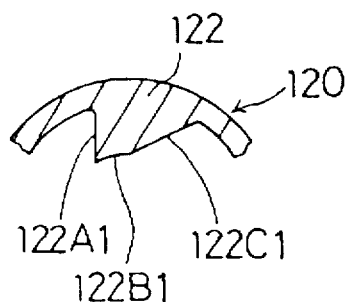
Figure 19:
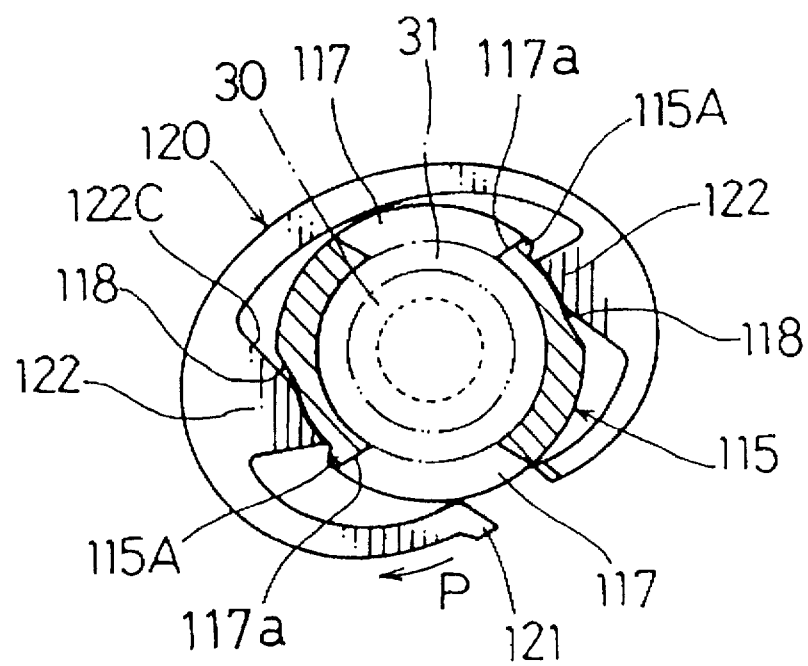
Figure 20:
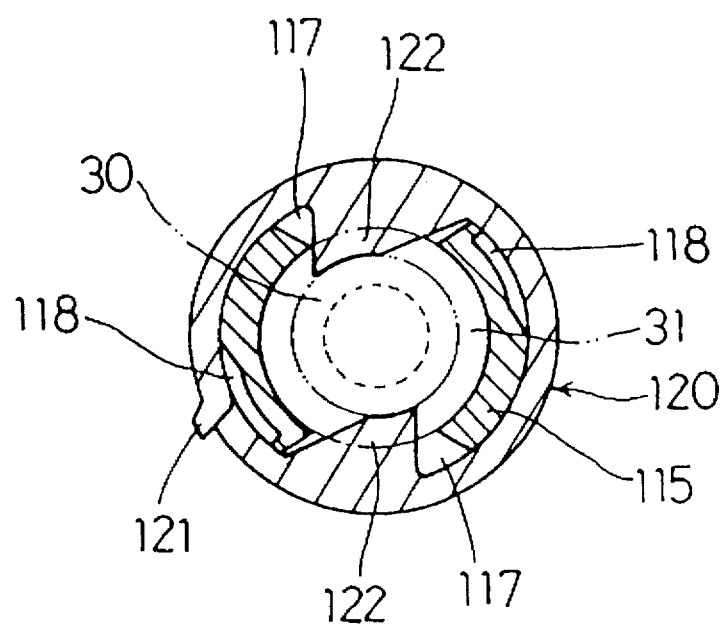
Figure 21:
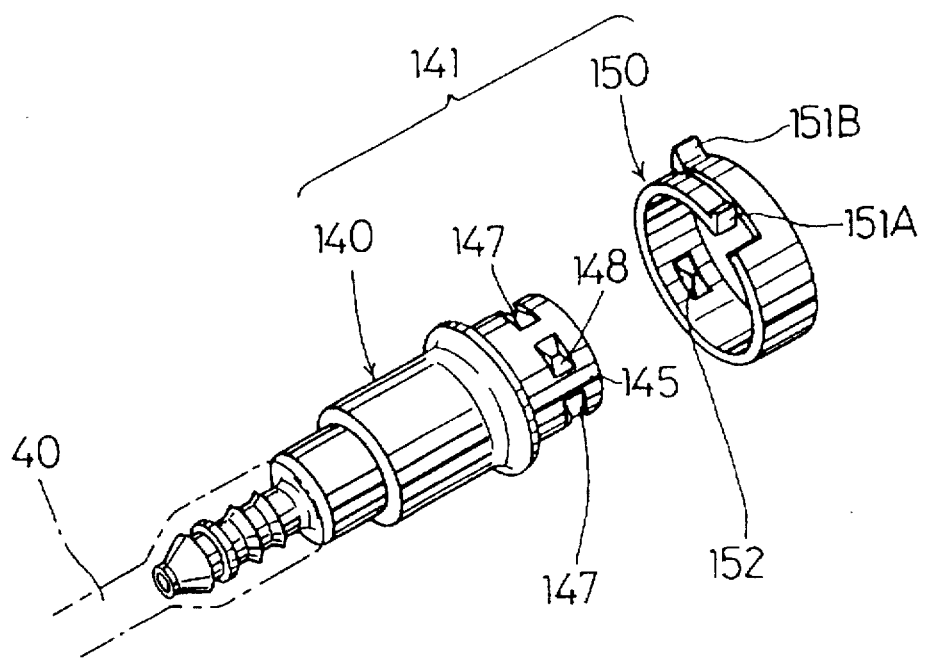
Figure 22:
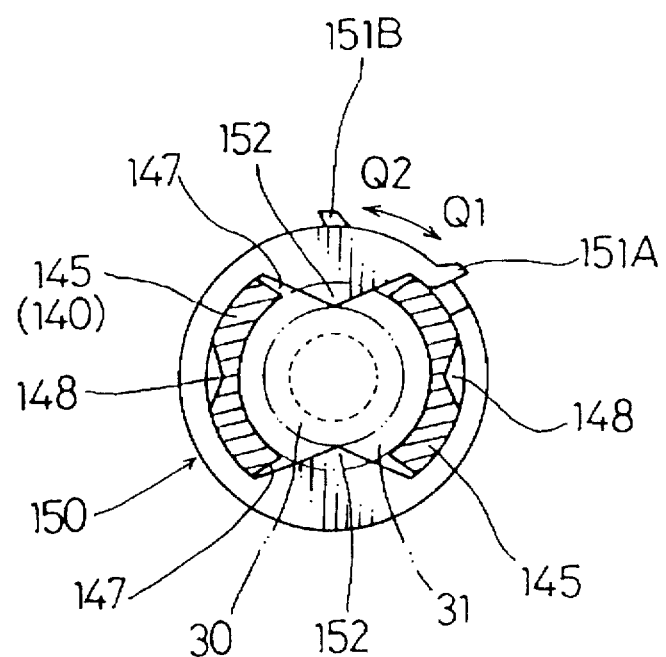
Figure 23:
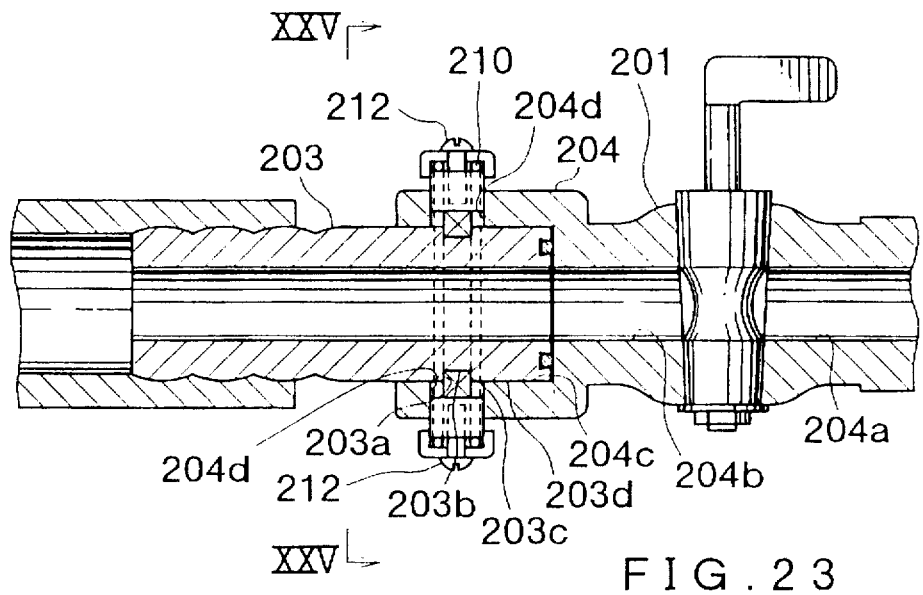
Figure 24:
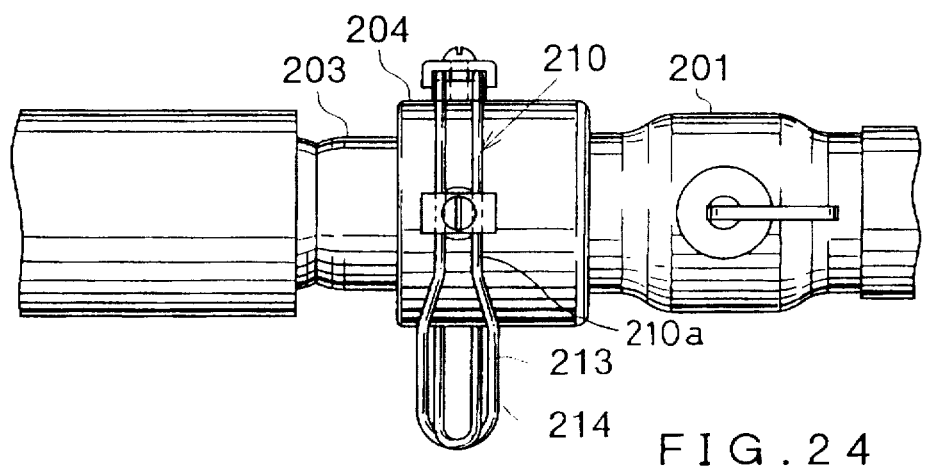

FIG. 17(B) is a sectional view of the clip shown in FIG. 17(A);

FIG. 18(A) is an enlarged sectional view taken along line XVIII—XVIIII in FIG. 17(A);

FIG. 18(B) is an enlarge sectional view of one of the engaging claws;

FIG. 19 is a view illustrating the operation of the connector shown in FIGS. 17(A) and 17(B);

FIG. 20 is a view similar to FIG. 19 but showing a different operation;

FIG. 21 is a perspective view of a connector according to a fourth embodiment of the present invention;

FIG. 22 is a view illustrating the operation of the connector of the fourth embodiment;

FIG. 23 is a sectional view of a body and a clip of a conventional connector;

FIG. 24 is a side of the conventional connector; and

Figure 25:
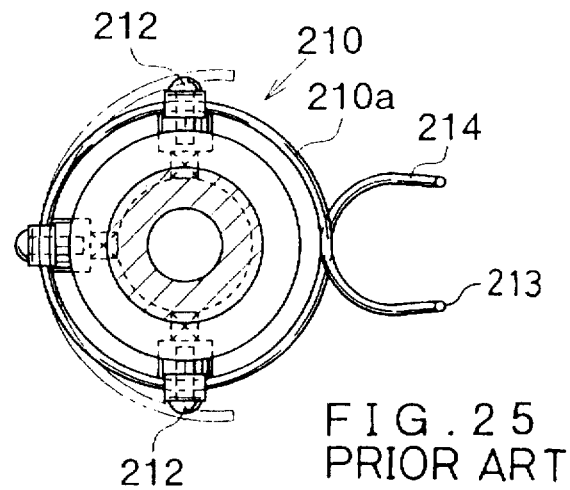

FIG. 25 is a sectional view taken along line XXV—XXV in FIG. 23.

DETAILED DESCRIPTION OF THE PREFERRED EMBODIMENT

A first embodiment of the present invention will now be explained with reference to FIGS. 1 to 6.

Figure 2:
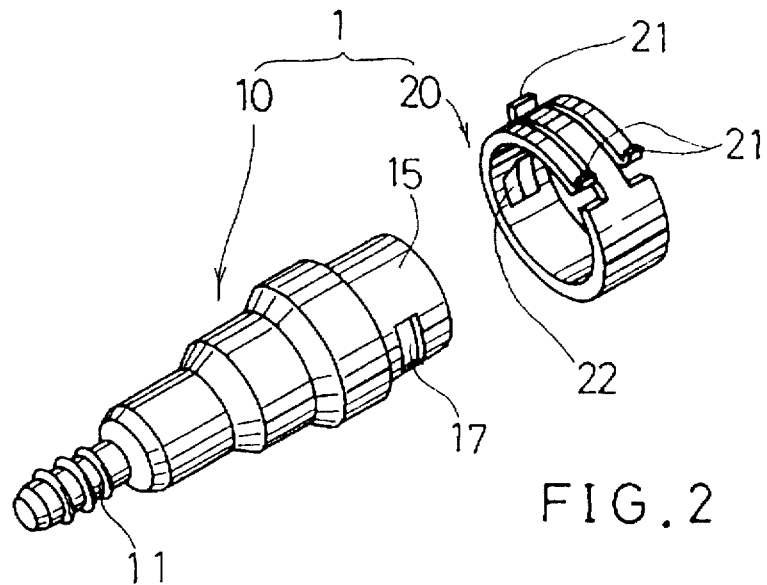
FIG. 2 is a perspective view of a body and a clip constituting the connector of the first embodiment.

As shown in FIG. 2, a connector 1 of this embodiment includes a tubular body 10 and a clip 20 which serves to prevent a pipe 30 from being removed from the body 10.

Figure 1:
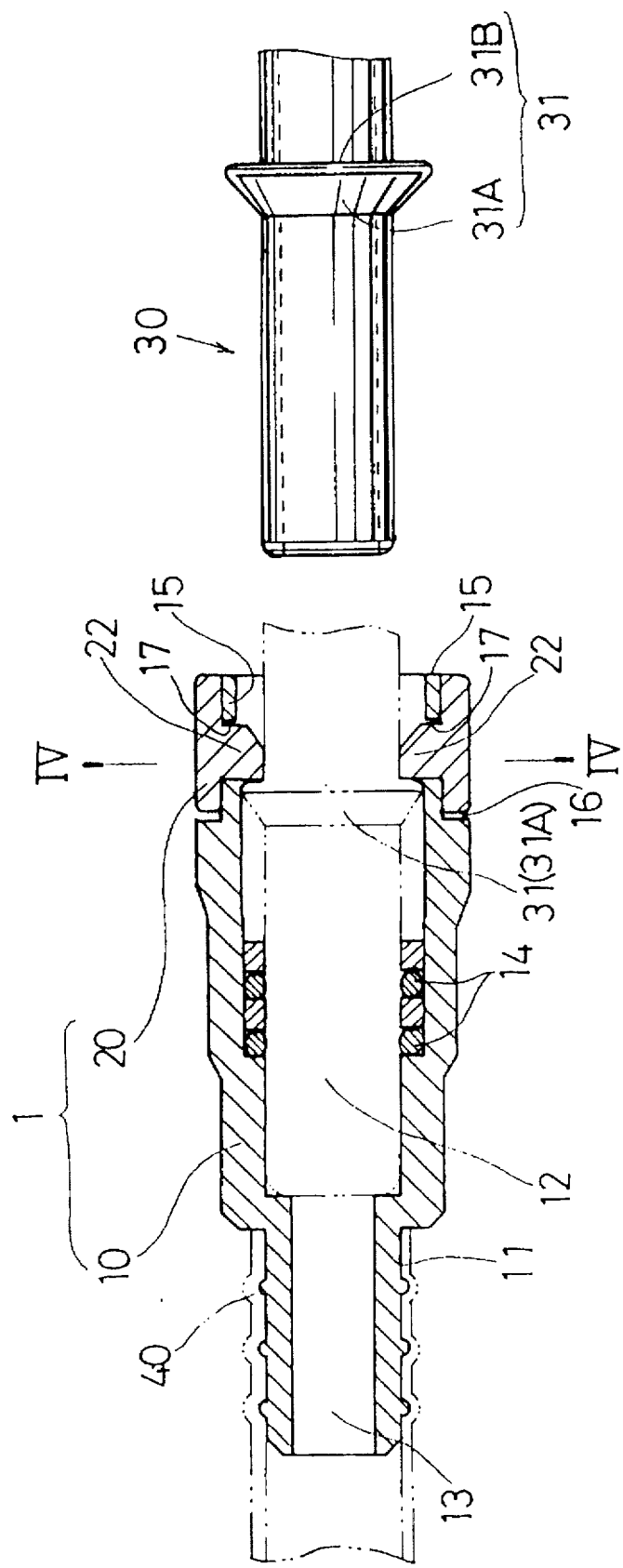
FIG. 1 is a sectional view of a connector according to a first embodiment of the present invention, with a view of a front part of a pipe.

As shown in FIG. 1, the pipe 30 includes a removal prevention protrusion 31 having a flange-like configuration and formed on an outer surface of the pipe 30 on the side of a front end adapted to be inserted into the connector 1. The removal prevention protrusion 31 has a front surface 31A (on the side of the front end) tapered toward the front end. The removal prevention protrusion 31 has a rear surface 31B forming a stepped portion to define an engaging surface. Thus, when giving consideration to both parts of the pipe 30 positioned on the front side and the rear side of the rear surface 31B, respectively, the diameter of the front side part is greater than the diameter of the rear side part. As shown in FIGS. 1 and 2, the body 10 has one end including a tubular hose connecting portion 11 adapted to connect a hose 40, and has the other end including a pipe receiving portion 12 for receiving the pipe 30 having the removal prevention protrusion 31 as described above. The pipe receiving portion 12 has a greater inner diameter part defined at a predetermined region on the side of its inlet for receiving the removal prevention protrusion 31, and has a smaller inner diameter part defined on the side away from the inlet for receiving only the front end of the pipe 30. The bottom of the pipe receiving portion 12 is in communication with a through hole 13 formed in a tubular hose connecting portion 11 having a smaller inner diameter. Seal layers 14 made of O-rings or the like are provided on the bottom side of the greater inner diameter part of the pipe receiving portion 12 for close fitting with the pipe 30 when inserted.

Figure 5:
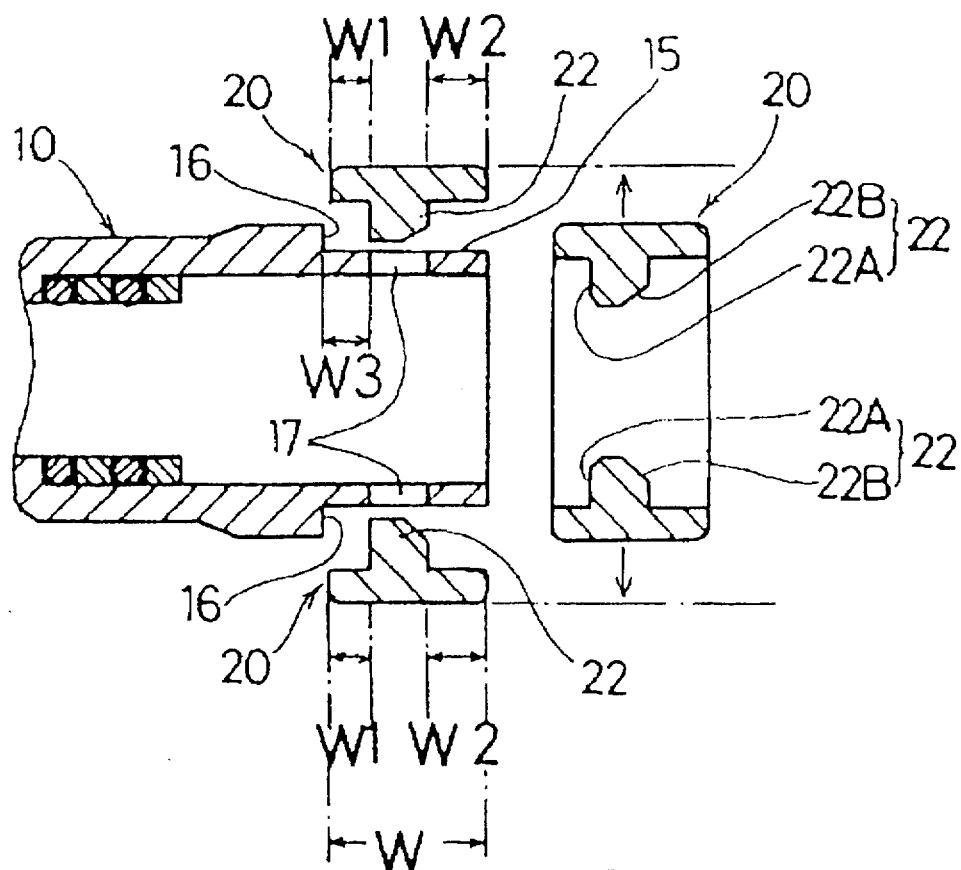
FIG. 5 is a view illustrating the operation for fitting the clip on the body.

A clip fitting portion 15 is formed on the inlet of the pipe receiving portion 12 for receiving the clip 20. The outer surface of the clip fitting portion 15 is connected to an outer surface of a greater thickness part of the greater inner diameter part via a stepped wall 16 as shown in FIGS. 1 and 5, so that the clip fitting portion 15 has a smaller thickness. A pair of diametrically confronting engaging holes 17 are formed through the clip fitting portion 15 having a smaller thickness as described above and are positioned to correspond to a pair of engaging claws 22 which will be explained

4 later. Here, the body 10 of this embodiment is formed integrally by synthetic resin having a great strength such as nylon 12 with glass fibers mixed thereto.

Figure 3:
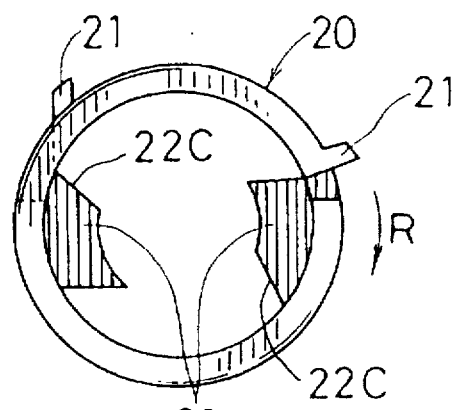
FIG. 3 is a front view of the clip.
Figure 4:
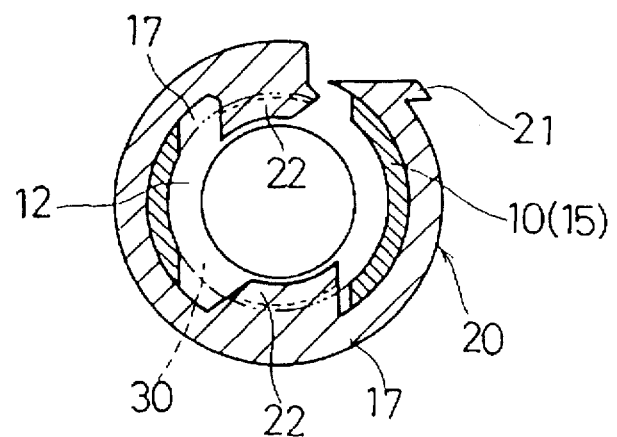
FIG. 4 is a sectional view taken along line IV—IV in FIG. 1.

The clip 20 has both circumferential ends confronting each other and has a ring-like configuration having an inner diameter slightly smaller than the outer diameter of the clip fitting portion 15. The clip 20 is made of resilient material, so that the clip 20 is expandable to increase the inner diameter. More specifically, as shown in FIGS. 2 to 4, in order to hold the ring-like configuration, the clip 20 of this embodiment has one circumferential end having an extension and has the other circumferential end confronting thereto and having a slit for receiving the extension. Knobs 21 are formed on both circumferential ends and are bent outwardly therefrom. The thickness of the ring-like body of the clip 20 is determined to have a smaller thickness such that the outer surface of the clip 20 is brought to flush with the outer surface of the greater thickness part of the body 10 when the clip 20 is fitted on the smaller thickness portion or the clip fitting portion 15.

The pair of the engaging claws 22 are formed on an inner peripheral surface of the clip 20 in predetermined positions and are adapted to be inserted into their respective engaging holes 17 so as to protrude within the pipe receiving portion 12. As shown in FIG. 5, in this embodiment, the engaging claws 22 are formed in the middle position in the axial direction of the clip 20. Here, an axial distance W1 between the engaging claws 22 and one end of the clip 20, an axial distance W2 between the engaging claws 22 and the other end of the clip 20 and an axial distance W3 between the engaging holes 17 and the stepped wall 16 are determined to have the relationship W1≦W3<W2, so that the engaging claws 22 can be brought to engage the engaging holes 17 only when a front surface 22A of each engaging claw 22 is positioned on the front side or the left side in FIG. 5, resulting in that the clip 20 is prevented from being mounted on the body 10 with a rear surface 22B of each engaging claw 22 positioned on the front side.

Figure 6:
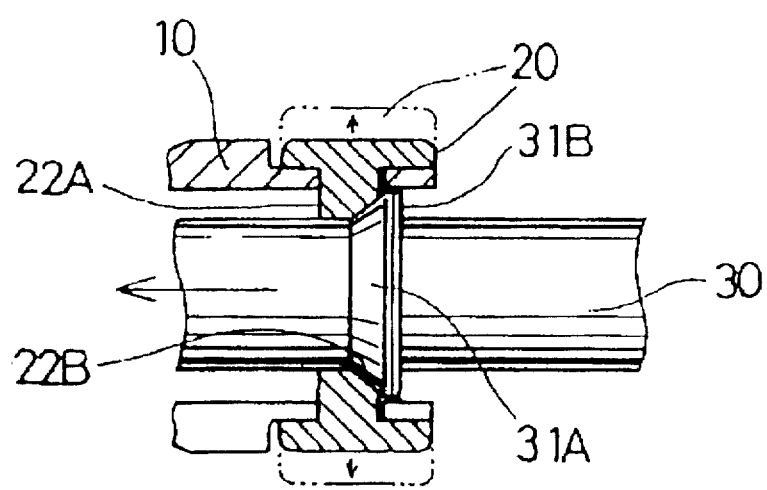
FIG. 6 is a view illustrating the operation of the clip.

As shown in FIGS. 5 and 6, the front surface 22A of each engaging claw 22 of the clip 20 has an upstanding wall-like configuration for engaging the stepped portion 31B of the removal prevention protrusion 31 of the pipe 30. On the other hand, the rear surface 22B of each engaging claw 22 has an inclined wall-like configuration and is inclined radially outwardly in a rearward direction so as to permit insertion of the removal prevention protrusion 31 into the body 10 beyond the engaging claws 22. Each engaging claw 22 has a protruding length sufficient to engage the removal prevention protrusion 31 of the pipe 30 within the pipe receiving portion 12. The clip 20 of this embodiment is made of synthetic resin such as nylon 12 and has resiliency for expanding its diameter by the operation of knobs 21.

The operation of the connector 1 of this embodiment will now be explained. Firstly, the clip 20 is mounted on the body 10. More specifically, as shown in FIG. 2, the clip 20 is positioned such that the front surfaces 22A of the engaging claws 22 confront the inlet of the pipe receiving portion 12 of the body 10 and that the engaging claws 22 can be easily inserted into the engaging holes 17. Then, the knobs 21 are operated to move toward each other for enlarging the diameter of the clip 20 sufficient to fit the engaging claws 22 over the clip fitting portion 15. The clip 20 having the enlarged diameter is then fitted over the clip fitting portion 15 until its front end abuts on the stepped wall 16 of the body 10, so that the engaging claws 22 is brought to a position for insertion into the engaging holes 17. Then, the knobs 21 are released to permit decrease in the diameter of the clip 20 by its resiliency, so that the engaging claws 22 are brought to engage the engaging holes 17.

Next, the front end of the pipe 30 on the side of the removal prevention protrusion 31 is inserted into the pipe receiving portion 12 of the connector 1. When the pipe 30 is inserted into the pipe receiving portion 12, the front surface 31A of the removal prevention protrusion 31 of the pipe 30 abuts on the rear surfaces 22B of the engaging claws 22. Since the front surface 31A of the removal prevention protrusion 31 is tapered toward the forward direction while the rear surfaces 22B of the engaging claws 22 are inclined radially outwardly in the rearward direction, the clip 20 is forced to be enlarged through the engaging claws 22 when the pipe 30 is forced to be inserted. When the removal prevention protrusion 31 of the pipe 30 is moved beyond the engaging claws 22, the engaging claws 22 return to protrude into the pipe receiving portion 12 and the clip 20 returns to be fitted on the clip fitting portion 15. In this state, the seal layers 14 seal between the body 10 and the pipe 30 thus inserted. Here, the hose 40 is connected to the hose connecting portion 11 of the body 10 after the clip 20 has been fitted on the body 10 as described above or before the clip 20 is fitted on the body 10.

As shown in FIG. 3, a lateral surface 22c on one side of each engaging claws 22 of the clip 20 in the circumferential direction is inclined in a clockwise direction relative to the diametrical direction. Therefore, when the clip 20 is rotated in the clockwise direction as indicated by an arrow R, each of the engaging claws 22 is disengaged from the engaging hole 17 under the guide of the lateral inclined surface 22c. As the result, the engaging state between the removal prevention protrusion 31 and the engaging claws 22 are released, so that the pipe 30 can be easily removed from the connector 1. During the removal operation of the pipe 30, the clip 20 is still held to fit on the body 10 and may not be removed.

A second embodiment of the present invention will now be explained with reference to FIGS. 7 to 11.

Figure 7:
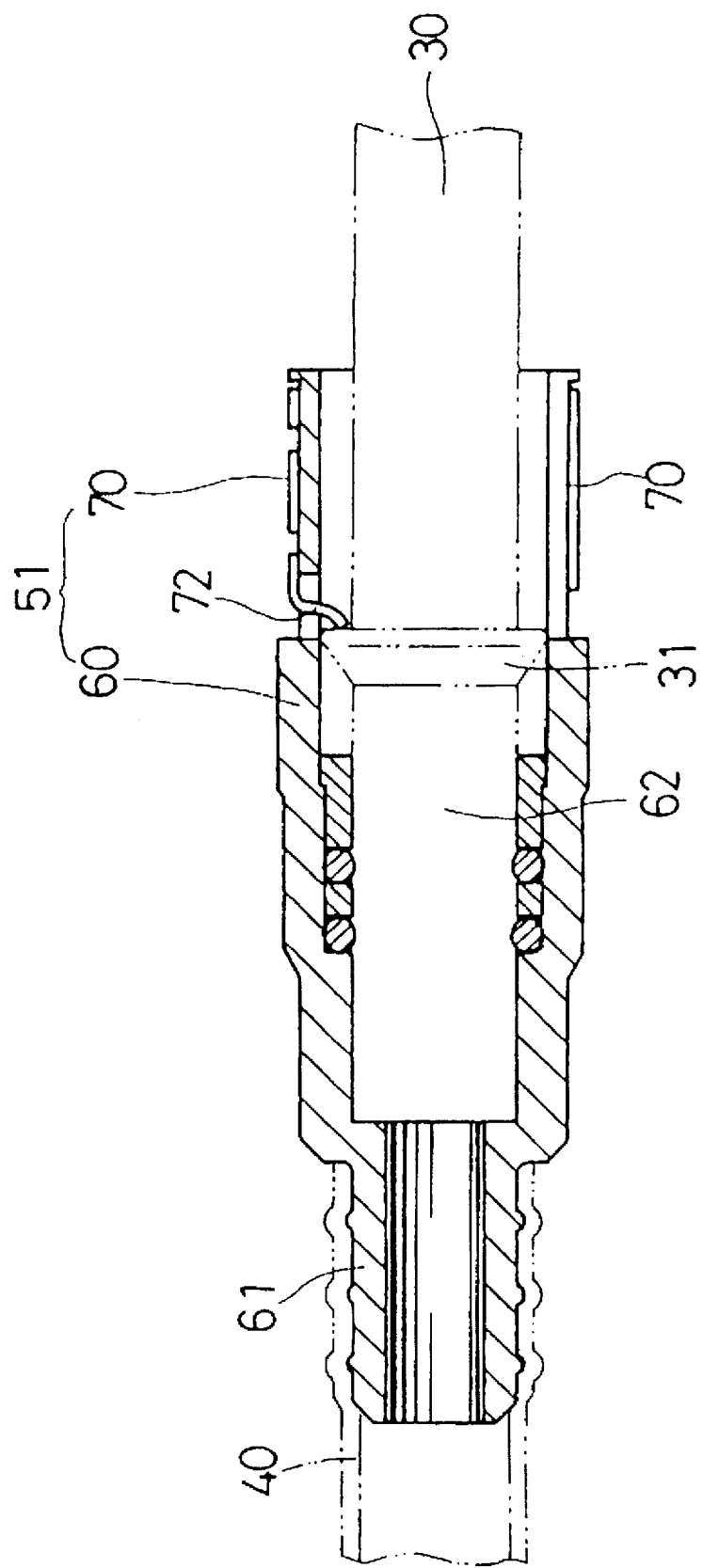
FIG. 7 is a sectional view of a connector according to a section embodiment of the present invention.
Figure 8:
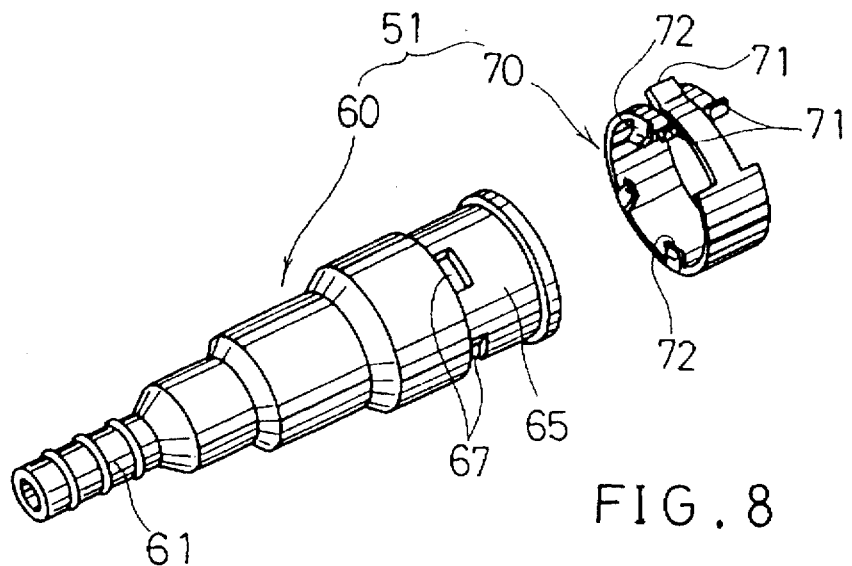
FIG. 8 is a perspective view of a body and a clip constituting the connector of the second embodiment.
Figure 9:
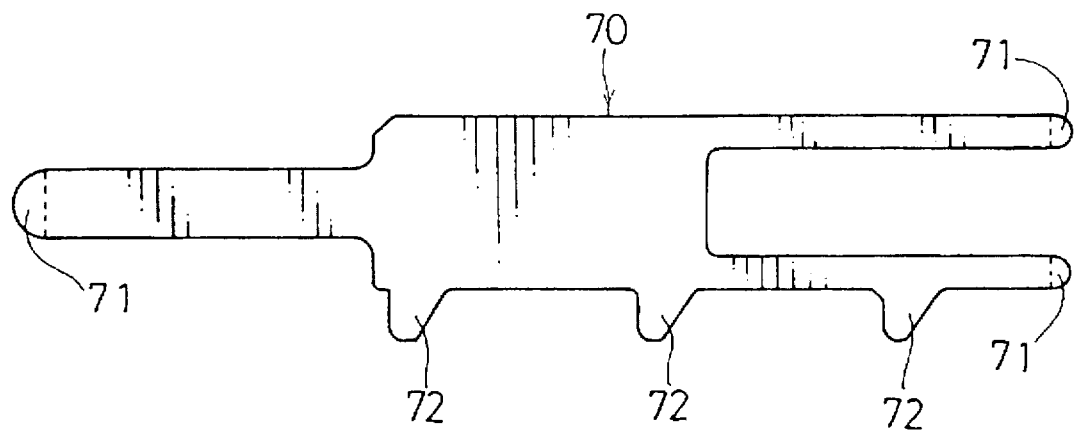
FIG. 9 is a view, in developed form, of the clip of the second embodiment.
Figure 10:
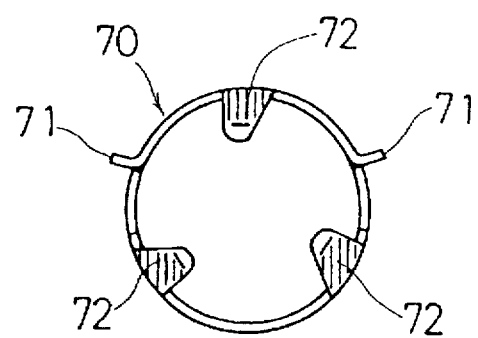
FIG. 10 is a front view of the clip of the second embodiment.

A connector 51 shown in FIG. 8 includes a body 60 made of synthetic resin and includes a clip 70 made of metal. The clip 70 is shown in developed form in FIG. 9 and is formed by a metal plate which is cut in a predetermined configuration and which is bent into a ring-like configuration. A plurality of engaging claws 72 (three in number in this embodiment) are formed with the metal plate and are substantially equally spaced from each other. The engaging claws 72 are bent toward the center of the ring-like configuration. As with the first embodiment, the clip 70 has both circumferential ends having an extension and a slit for receiving the extension, respectively, and knobs 71 are formed on both circumferential ends and are bent outwardly therefrom. The clip 70 has resiliency (spring resiliency to reduce its diameter to the original diameter when the clip 70 is expanded by moving the knobs 71 on both circumferential ends to move toward each other. As shown in FIG. 7, each of the engaging claws 72 has a claw end bent forwardly (see FIG. 11(B)).

A clip fitting portion 65 of a pipe receiving portion 62 of the body 60 has a thickness smaller than the other part of the pipe receiving portion 62 by the thickness of the clip 70. In addition, the clip fitting portion 65 has an outer end having an outer diameter smaller than the other part thereof by the thickness of the clip 70. Since the clip fitting portion 65 has a reduced thickness and since the clip 70 may have a thickness smaller than a clip made of resin because of forming by processing the metal plate, the body 60 with the clip 70 fitted thereon may not have a greater diameter. A pair of engaging holes 67 are formed through the clip fitting portion 65 of the body 60 in positions corresponding to the engaging claws 72. Numeral 61 designates a hose connection portion. The operation for fitting the clip 70 on the body 60 may be performed according to the same process as described in the first embodiment. Thus, the pipe 30 can be inserted in the state where the clip 70 is fitted on the body 60. On the other hand, the pipe 30 can be removed from the connector 51 by rotating the clip 70 to disengage the engaging claws 72 from the engaging holes 67.

Figure 11A:
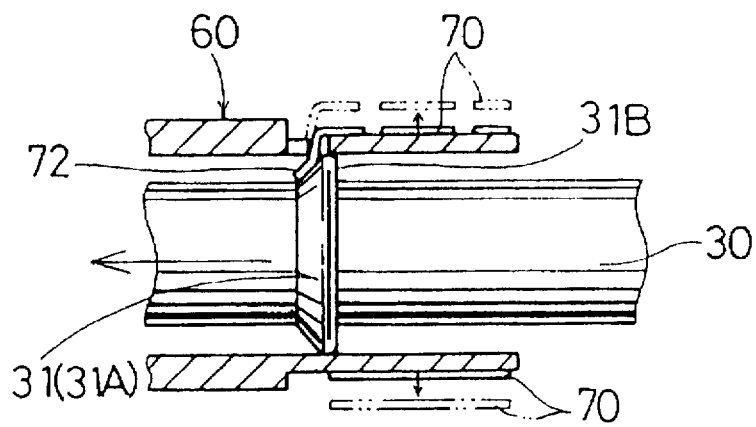
FIG. 11(A) is a view illustrating the operation of the clip of the second embodiment.
Figure 11B:
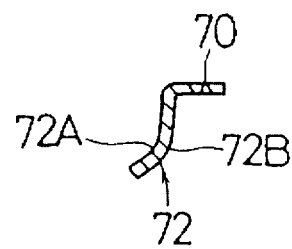
FIG. 11(B) is a sectional view of one of engaging claws.

Since the claw end of each engaging claw 72 is bent forwardly as described above, the claw end has a rear surface 72B inclined radially outwardly in the rearward direction as shown in FIGS. 11(A) and 11(B). Therefore, when the pipe 30 is inserted into the body 60, the tapered front surface 31A of the removal prevention protrusion 31 of the pipe 30 can pass between the engaging claws 72 and the removal prevention protrusion 31 can move beyond the engaging claws 72 to a position forwardly of the engaging claws 72. When the removal prevention protrusion 31 is thus moved beyond the engaging claws 72, the vertical wall-like rear surface 31B of the removal prevention protrusion 31 is brought to be engaged by the engaging claws 72 of the clip 70, so that the pipe 30 can be connected in a removal prevention manner.

Figure 12:
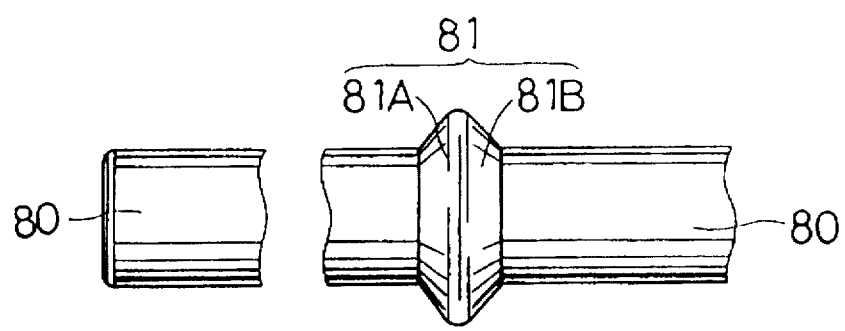
FIG. 12 is a view illustrating the configuration of a different type of pipe.

In the above first and second embodiments, the pipe 30 has the removal prevention protrusion 31 which includes the front surface 31A tapered toward the forward direction and which includes the upstanding rear surface 31B as an engaging surface. However, when the metal clip 70 is used, since the engaging claws 72 of the clip 70 have good biting ability into the pipe 30, the upstanding engaging surface may not be required for the pipe 30. Thus, in this case, a pipe 80 shown in FIG. 12 can be used. The pipe 80 has a removal prevention protrusion 81 which includes a tapered front surface 81A and a tapered rear surface 81B having the same inclination angle as the front surface 81A. This pipe 80 can be easily manufactured, so that the manufacturing costs of the pipe can be reduced.

Figure 13:
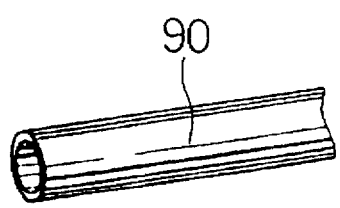
FIG. 13 is a view illustrating the configuration of a further different type of pipe.
Figure 14:
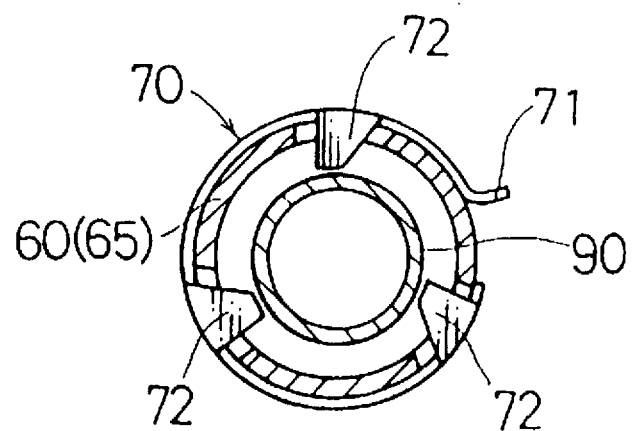
FIG. 14 is a view illustrating the engaging state of the pipe shown in FIG. 13.

In addition, in case of the connector 51 having the metal clip 70 of the second embodiment, a pipe 90 made of resin and having no removal prevention protrusion as shown in FIG. 13 can be adopted. When the pipe 90 is inserted into the pipe receiving portion 62 of the connector 51, the metal engaging claws 72 may bite into the pipe 90, so that the pipe 90 can be prevented from removal. Thus, the pipe 90 can be reliably engaged even if it does not include the removal prevention protrusion. This pipe 90 made of resin and having no removal prevention protrusion is simple in configuration, so that the manufacturing costs of the pipe can be reduced.

Figure 15:
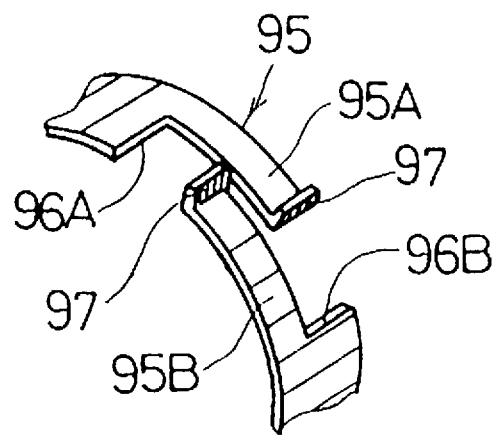
FIG. 15 is a view illustrating the configuration of circumferential ends of a clip as a modification of the clip of the second embodiment.

Further, although in the first and second embodiments, the clip 20 or 70 has both circumferential ends having the extension and the slit for receiving the extension, respectively, and although the knobs 21 or 71 are formed on both circumferential ends and are bent outwardly therefrom, the circumferential ends may have configurations other than the extension or the slit. For example, a clip 95 shown in FIG. 15 includes circumferential ends 95A and 95B which include cut-out recesses 96A and 96B, respectively, on the side opposite to each other. The circumferential end 95A enters the cut-out recess 96B of the circumferential end 95B confronting thereto, while the circumferential end 95B enters the cut-out recess 96A of the circumferential end 95A confronting thereto. Each of the circumferential ends 95A and 95B has an upwardly bent knob 97.

Furthermore, although the clip 20 or 70 or 95 of the above embodiments has the knobs 21 or 71 or 97, a clip (not shown) having no knobs can be used if the operation for rotating and expanding the clip is made by an appropriate tool.

A third embodiment of the present invention will now be explained with reference to FIGS. 16 to 20.

Figure 16:
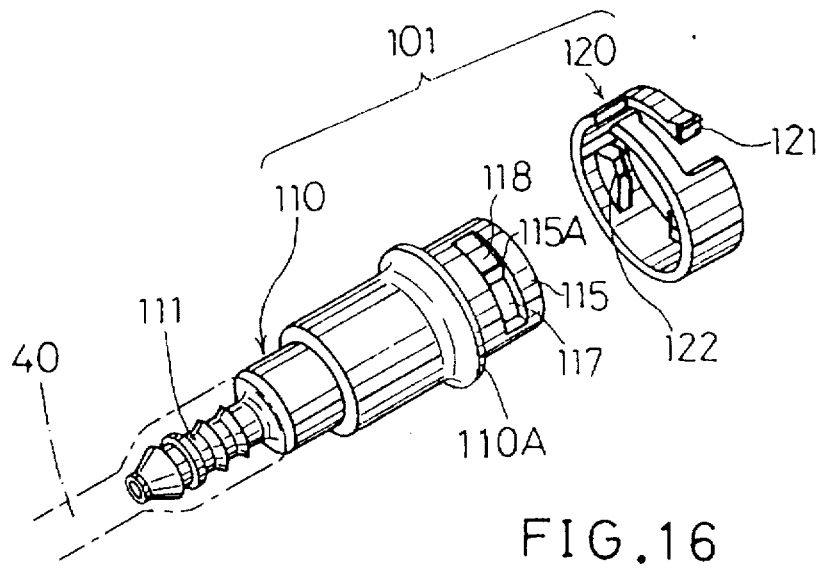
FIG. 16 is a perspective view of a body and a clip constituting a connector according to a third embodiment of the present invention.

As shown in FIG. 16, a connector 101 of this embodiment includes a tubular body 110 and a clip 120 which serves to prevent the pipe 30 from being removed from the body 110.

The pipe 30 used for the connector 101 is that shown in FIG. 1 and includes the removal prevention protrusion 31 having a flange-like configuration and formed on an outer surface of the pipe 30 on the side of the front end adapted to be inserted into the connector 101. More specifically, the removal prevention protrusion 31 has the front surface 31A (on the side of the front end) tapered toward the front end. The removal prevention protrusion 31 has the rear surface 31B upstanding to define an engaging surface.

The body 110 has substantially the same construction as the body 10 of the first embodiment shown in FIGS. 1 and 2 except a clip fitting portion 115 which will be explained later. Thus, the body 110 has one end including a tubular hose connecting portion 111 adapted to connect the hose 40, and has the other end including a pipe receiving portion 112 for receiving the pipe 30 having the removal prevention protrusion 31 as described above. The pipe receiving portion 112 has a greater inner diameter part defined at a predetermined region on the side of its inlet for receiving the removal prevention protrusion 31, and has inner diameter part defined on the side away from the inlet for receiving only the front end of the pipe 30. As shown in FIG. 17(A), the bottom of the pipe receiving portion 112 is in communication with a through hole 113 formed in a tubular hose connecting portion 111 having a smaller inner diameter. Seal layers 114 are provided on the bottom side of the greater inner diameter part of the pipe receiving portion 112 for close fitting with the pipe 30 when inserted.

The clip fitting portion 115 is formed on the inlet of the pipe receiving portion 112 for receiving the clip 120. As shown in FIG. 16, FIG. 17(A) and FIG. 17(B), the clip fitting portion 115 has a thickness smaller than the remaining part of the body 110 and is connected to a central greater outer diameter part 110A in a stepped manner. The clip fitting portion 115 having a smaller thickness as described above includes a pair of diametrically opposing engaging holes 117 formed therein for engaging a pair of engaging claws 122 which will be explained later. A retainer recess 118 is formed adjacent the corresponding engaging hole 117 in the circumferential direction. The retainer recess 118 has a predetermined depth which becomes shallower in a direction away from the corresponding engaging hole 117 and is smoothly connected to the peripheral surface of the remaining part of the clip fitting portion 115. The retainer recess 118 and its corresponding engaging hole 117 are separated by a peripheral surface part 115A as shown in FIGS. 16, 17(A) and 17(B).

The body 110 is formed integrally by synthetic resin having a greater strength.

As shown in FIG. 16, the clip 120 has a ring-like configuration having both circumferential ends which include cut-out portions on the opposite sides in the axial direction. The inner diameter of the clip 120 under no load is slightly smaller than the outer diameter of the clip fitting portion 115. The clip 120 is made of material having resiliency, so that the diameter of the clip 120 can be expanded. Each circumferential end of the clip 120 enters the cut-out portion formed in the other circumferential end confronting thereto, so that the clip 120 has the ring-shaped configuration as described above. One of the circumferential ends includes a knob 121 bent outwardly therefrom. The thickness of the clip 120 is determined such that the outer diameter of the clip 120 when mounted on the clip fitting portion 115 does not exceed the diameter of the greater outer diameter part 110A.

The engaging claws 122 are formed in predetermined positions of the clip 110 and extend radially inwardly. The engaging claws 122 are adapted for inserting into the engaging holes 117 so as to protrude into the pipe receiving portion 112.

As shown in FIG. 17(B), a front surface 122A of each engaging claw 122 of the clip 120 has an upstanding wall-like configuration for engaging the rear surface 31B of the removal prevention protrusion 31 of the pipe 30. On the other hand, a rear surface 122B of each engaging claw 122 has an inclined wall-like configuration and is inclined radially outwardly in a rearward direction so as to permit insertion of the removal prevention protrusion 31 of the pipe 30 into the body 110 beyond the engaging claws 122. Each engaging claw 122 has a protruding length sufficient to engage the removal prevention protrusion 31 of the pipe 30 within the pipe receiving portion 112. As shown in FIG. 18(B), each of the engaging claws 122 has a configuration which varies in the circumferential direction of the clip 120 and includes a vertical upstanding surface 122A1 for abutting on a lateral surface of the corresponding engaging hole 117, a concave curved surface 122B1 (not limited to the curved surface) corresponding to the configuration of outer surface of the pipe 30, and an inclined surface 122C1 inclined radially outwardly toward the inner surface of the clip 120 in a clockwise direction. The clip 120 is made of synthetic resin such as nylon 12 and has resiliency to expand its diameter by operation of the knob 121.

The operation for mounting the clip 120 on the body 110 will now be explained. Firstly, as shown in FIGS. 16 and 17, the clip 120 is positioned such that the front surfaces 122A of the engaging claws 122 confront the clip fitting portion 115 of the body 110 and that the engaging claws 122 can be easily inserted into the engaging holes 117 of the body 110. Then, by using an appropriate tool for opening the circumferential ends of the clip 120, the clip 120 is expanded to have a diameter sufficient to fit the engaging claws 22 over the clip fitting portion 115. The clip 120 having the enlarged diameter is then fitted over the clip fitting portion 115 until its front end abuts on the stepped wall formed by the greater outer diameter part 110A of the body 110, so that the engaging claws 122 come to a position for inserting into the engaging holes 117. Then, the diameter-enlarging tool is released to permit decrease in the diameter of the clip 120 by its resiliency, so that the engaging claws 122 are brought to engage the engaging holes 117 (see FIGS. 17(A), 17(B) and 18(A)).

Next, the front end of the pipe 30 on the side of the removal prevention protrusion 31 is inserted into the pipe receiving portion 112 of the connector 101. As shown in FIGS. 17(A) and 17(B), when the pipe 30 is inserted into the pipe receiving portion 112, the front surface 31A of the removal prevention protrusion 31 of the pipe 30 abuts on the rear surfaces 122B of the engaging claws 122. When the pipe 30 is forced to be inserted, the front surface 31A of the removal prevention protrusion 31 tapered toward the forward direction forces the rear surfaces 122B of the engaging claws 122 inclined radially outwardly the rearward direction to move radially outwardly. The clip 120 is therefore expanded through the engaging claws 122. When the removal prevention protrusion 31 of the pipe 30 moved beyond the engaging claws 122, the engaging claws 122 return to protrude into the pipe receiving portion 112 and the clip 120 returns to be fitted on the clip fitting portion 115. In this state, the seal layers 114 seal between the body 110 and the pipe 30 thus inserted. Here, the hose 40 is connected to the hose connecting portion 111 of the body 110. Thus, the pipe 30 can be easily connected to the body 110 by forcibly inserting the pipe 30 into the pipe receiving portion 112.

In order to remove the pipe 30 from the connector 101, the operator pushes the knob 121 of the clip 120 in the circumferential direction, so that, with the aid of the inclined surface 122C1, each of the engaging claws 122 move from the corresponding engaging hole 117 to the retainer recess 118 beyond the peripheral surface part 115A of the clip fitting portion 115, and that the engaging claws 122 are brought to engage the retainer recesses 118 while the clip 129 is held in the expanded state. Since the engaging claws 122 are thus removed from the engaging holes 117, the pipe 30 which has been fitted can be easily removed. After removing the pipe 30, the connector 101 can recover the state for mounting another pipe 30 by further pushing the knob 121 with the clip 120 held in the mounting state on the body 110. That is, with the connector 101 in the state shown in FIG. 19, the operator continues to push the knob 121 in the direction indicated by an arrow P, so that each of the engaging claws 122 of the clip 120 held in the mounting state slidably moves from the retainer recess 118 onto the outer surface of the remaining part of the clip fitting portion 115 and further moves therefrom to engage the engaging hole 117 positioned on the opposite side as shown in FIG. 20. With the engaging claws 122 thus engaged with the engaging holes 117, the pipe 30 is inserted into the pipe receiving portion 112, so that the pipe 30 can be connected to the connector 101. Here, as shown in FIG. 19, since a lateral surface 117a of each engaging hole 117 positioned on the side in the circumferential direction indicated by the arrow P is inclined radially outwardly in the direction of the arrow P relative to the diametrical direction, so that the engaging claws 122 can be further easily removed from the engaging holes 117. With the provision of the inclined lateral surface 117a, an upstanding surface may be incorporated in place of the inclined surface 122C1 of the engaging claw 122.

A fourth embodiment of the present invention will now be explained with reference to FIGS. 21 and 22. This fourth embodiment is a modification of the third embodiment.

As with the connectors of the first to third embodiments, a connector 141 of this embodiment includes a body 140 and a clip 150 as shown in FIG. 21. The body 140 has a clip fitting portion 145 in which a pair of diametrically confronting engaging holes 147 are formed for engagement with a pair of engaging claws 152 of the clip 150. A pair of retainer recesses 148 are formed on the outer surface of the clip fitting portion 145 in circumferentially intermediate positions between the engaging holes 147. Each of the retainer recesses 148 has a substantially V-shaped configuration and is enlarged in the outward direction.

On the other hand, as shown in FIG. 21, the clip 150 has a ring-shaped configuration and has both circumferential ends having cut-out portions formed therein for receiving the circumferential ends confronting thereto, respectively. The circumferential ends have knobs 151A and 151B formed thereon, respectively. The engaging claws 152 are formed on the inner peripheral surface of the clip 150 in predetermined positions confronting each other for engaging the engaging holes 147. Each of the engaging claws 152 has a substantially triangular prism-like configuration having a sharp ridge and having a relatively small inclination angle. In other respect, the construction is the same as the connector 101 of the third embodiment.

In operation, when the clip 150 is fitted on the clip fitting portion 145 of the body 140 with the engaging claws 152 engaging their corresponding engaging holes 147, the pipe 30 having the removal prevention protrusion 31 can be inserted into a pipe receiving portion of the body 140 for connection thereto.

In order to remove the pipe 30 from the connector 141, as shown in FIG. 22, the operator pushes the knob 151A in the direction indicated by an arrow Q1 or pushes the knob 151B in the direction indicated by an arrow Q2, so that the engaging claws 152 engaged with the engaging holes 147 are moved from the engaging holes 147 onto the outer surface of the clip fitting portion 145, and that the engaging claws 152 are then moved to engage the retainer recesses 148 so as to be held in these positions. The engaging claws 152 are removed from the engaging holes 147 when the engaging claws 152 are thus held by the retainer recesses 148, so that the pipe 30 can be easily removed from the connector 141.

After the pipe 30 has been removed, the operator further pushes the knob 151A of clip 150 in the direction of arrow Q1 or further pushes the knob 151B in the direction of arrow Q2, so that each of the engaging claws 152 are moved from the retainer recesses 148 of the clip fitting portion 145 to the engaging holes 147 positioned on the opposite side, and that the engaging claws 152 engage the engaging holes 147. Thus, the pipe 30 can be inserted into the pipe receiving portion of the body 140 for connection with the connector 141 in the same manner as the third embodiment.

This modified embodiment is advantageous in the following points. By pushing any one of the knobs 151A and 151B of the clip 150, the engaging claws 152 are removed from the engaging holes 147 and are then held by the retainer recesses 148, so that the pipe 30 can be easily removed. In addition, after the pipe 30 has been removed, the connector 141 can recover the state for permitting the connection of the pipe 30 by pushing any one of the knobs 151A and 151B.

As described above, according to the present invention, the engaging claws for engaging the pipe can be removed from the engaging holes by rotating the clip around the clip fitting portion, so that the pipe can be easily removed.

While the invention has been described with reference to preferred embodiments thereof, it is to be understood that modifications or variations may be easily made without departing from the spirit of this invention which is defined by the appended claims.

What is claimed is:

1. A connector operable to connect a pipe in a removal prevention state and operable to permit removal of the pipe from the connector by releasing the removal prevention state, the pipe having a stepped portion formed in a position spaced from one end of the pipe by a predetermined distance, the stepped portion including a first part on the side of one end and including a second part on the side of the other end, and the first part having a greater outer diameter than the second part, comprising:

a substantially tubular body; and
a clip having substantially ring-shaped configuration;
said body having a through hole formed therein and extending from one end to the other end thereof;

said through hole including a first hole part on the side of one end of said body and a second hole part on the side of the other end of said body, said first hole part having a diameter smaller than the first part of the stepped portion of the pipe, and said second hole part having a diameter greater than the diameter of the first part of the stepped portion;

said body having at least one pair of engaging holes extending from an outer surface of said body to said through hole at said second hole part;

said clip having resiliency;

said clip having at least one pair of engaging claws formed on an inner peripheral surface in positions corresponding to said at least one pair of engaging holes;

each of said engaging claws protruding into said through hole through corresponding one of said engaging holes and confronting the stepped portion of the pipe when no load is applied to said clip;

a lateral surface in the circumferential direction formed as an inclined surface, on at least one of each of said engaging claws and engaging holes, so that each of said engaging claws is disengaged from corresponding one of said engaging holes with the aid of said inclined surface when said clip is rotated in the circumferential direction;

said body having an abutting wall formed on an outer surface of said body between the side of one end and the side of the other end of said body, said abutting wall being adapted to axially abut on said clip;

said engaging claws being formed on a middle position of said clip in an axial direction thereof; and the distance between said abutting wall and said engaging holes in the axial direction being greater than the distance between one end of said clip on the side of one end of said body and said engaging claws and is smaller than the distance between the other end of said clip and said engaging claws.

2. The connector as defined in claim 1 wherein each of said engaging claws includes a inclined surface positioned on the side of the other end of said body, so that each of said engaging claws is moved radially outwardly with the aid of said inclined surface on the side of the other end of said body so as to permit passage of the first part of the stepped portion having a greater diameter when the pipe is inserted into said through hole from the side of the other end of said body.

3. The connector as defined in claim 1 further including a retainer recess formed on said outer surface of said body in a position adjacent each of said engaging holes in the circumferential direction of said body, said retainer recess being adapted to retain corresponding one of said engaging claws.

4. A connector operable to connect a pipe in a removal prevention state and operable to permit removal of the pipe from the connector by releasing the removal prevention state, the pipe having a stepped portion formed in a position spaced from one end of the pipe by a predetermined distance, the stepped portion including a first part on the side of one end and including a second part on the side of the other end, and the first part having a greater outer diameter than the second part, comprising:

a substantially tubular body; and a clip having substantially ring-shaped configuration;

said body having a through hole formed therein and extending from one end to the other end thereof;

said through hole including a first hole part on the side of one end of said body and a second hole part on the side of the other end of said body, said first hole part having a diameter smaller than the first part of the stepped portion of the pipe, and said second hole part having a diameter greater than the diameter of the first part of the stepped portion;

said body having at least one pair of engaging holes extending from an outer surface of said body to said through hole at said second hole part;

said clip having resiliency;

said clip having at least one pair of engaging claws formed on an inner peripheral surface in positions corresponding to said at least one pair of engaging holes;

each of said engaging claws protruding into said through hole through corresponding one of said engaging holes and confronting the stepped portion of the pipe when no load is applied to said clip;

a lateral surface in the circumferential direction formed as an inclined surface, on at least one of each of said engaging claws and engaging holes, each of said engaging claws being disengageable from corresponding one of said engaging holes with the aid of said inclined surface thereof when said clip is rotated in the circumferential direction; and a retainer recess formed on said outer surface of said body in a position adjacent each of said engaging holes in the circumferential direction of said body, each said retainer recess being sized to retain corresponding ones of said engaging claws.

5. The connector as defined in claim 4 wherein each of said engaging claws includes an inclined surface positioned on the side of the other end of said body, so that each of said engaging claws is moved radially outwardly with the aid of said inclined surface on the side of the other end of said body so as to permit passage of the first part of the stepped portion having a greater diameter when the pipe is inserted into said through hole from the side of the other end of said body.

* * * * *

UNITED STATES PATENT AND TRADEMARK OFFICE
CERTIFICATE OF CORRECTION

PATENT NO. : 5,704,658
DATED : January 6, 1998
INVENTOR(S) : Kenji Tozaki and Minoru Kaneko It is certified that error appears in the above-indentified patent and that said Letters Patent is hereby corrected as shown below:

Column 7, line 31, after the word "has" insert -- a smaller --.

Column 8, line 67, after the word "outwardly" insert -- in --.

Column 9, line 3, after "pipe 30" insert -- is --.

Signed and Sealed this

Fifth Day of May, 1998

*Attest:*

BRUCE LEHMAN

*Attesting Officer*     *Commissioner of Patents and Trademarks*